Figure 1:
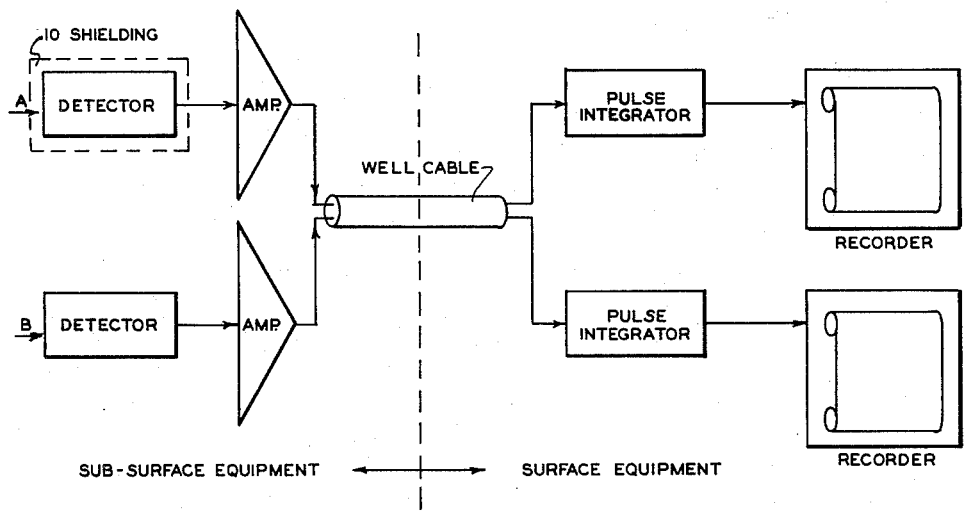

Sept. 29, 1964        E. S. MARDOCK        3,151,246

GEOPHYSICAL PROSPECTING FOR UNDERGROUND MINERAL DEPOSITS

Filed April 27, 1959

*INVENTOR.*
EDWIN S. MARDOCK
BY

ATTORNEY 3,151,246
GEOPHYSICAL PROSPECTING FOR UNDERGROUND MINERAL DEPOSITS
Edwin S. Mardock, Tulsa, Okla., assignor, by mesne assignments, to Dresser Industries, Inc., Dallas, Tex., a corporation of Delaware
Filed Apr. 27, 1959, Ser. No. 809,240
6 Claims. (Cl. 250—106)

This invention relates to the art of geophysical prospecting for underground mineral deposits. More particularly, the invention is concerned with improvements in radioactivity tracer logging techniques as applied to oil recovery operations.

Radioactivity tracer logging is a well known form of underground formation study wherein radioactive materials are employed in accordance with well known methods, and wherein the ultimate distribution of such materials is determined by radioactivity detection techniques whereby to obtain information concerning the formation. One such method, in which radioactive particles are filtered out on the formations as an indication of the flow of fluid from a bore hole, is described in U.S. Patent No. 2,810,076 to Edwin S. Mardock. The radioactive material which is distributed throughout the well is known as the tracer material and the methods by which the distribution of the tracer is determined are known as radioactivity tracer logging. Radioactivity tracer logging is quite closely related to what is known generally as radioactivity well logging in the sense that indications of the distribution assumed by the tracer with respect to the formation and of the fluids of the well bore are provided by the use of radiation detecting instrumentation. The intelligence afforded by the detection operation is recorded after having been suitably translated by further instrumentation to electrical impulses by means of apparatus associated with the detector. The recording is known as a tracer log and as is customary in the case of radioactivity well logging, the tracer log is correlated with depth of origin of the radiations which make up the recorded signals. It is not believed necessary here to describe further the details of the various well known possible manners of preparing tracer logs. Similarly, the presently patented art and much literature described numerous applications of tracer logging technique whereby to provide information reflecting particular characteristics of underground formations and the manner in which fluid moves into and through the underground formations when the underground fluids are placed under pressure. The present invention provides improvements in such well known tracer logging methods.

One of the very serious problems which is encountered in oil well drilling involves the loss of drilling fluids. Inasmuch as drilling fluids are expensive and used in great quantities, considerable effort has been put forth to determine the points of loss along the formation. When the well is uncased, using present day traced logging methods it is possible to locate the points along the formation where the drilling fluid is escaping out into the surrounding earth. Where a well is cased, however it is a more difficult problem to locate points in the casing where the fluid escaped therefrom or to locate the "thief" zone taking fluid. This problem has not heretofore been solved; however, as will be seen at a later point herein, the present invention provides a new technique by which thief zones and casing leaks may be located without difficulty.

A further problem which arises in underground earth study involves determinations respecting the nature of the porosity of formations. As is well know, by present logging methods it is easily possible to determine whether a particular zone of the underground earth is a porous zone; however, present methods do not permit a determination in detail of the nature of the porosity, i.e., whether it consists of fractures, intergranular pores, fissures or vugular openings. Information concerning such conditions is of great value to an engineer who is responsible for the efficient exploration of the oil field. Information concerning the nature of the porous structure renders it possible for him to make more accurate early estimates of reserves, because the identification of the type of porosity indicates the range of permeability existing which in turn assists in determining the type of decline curve which the oil production of the field will follow. According to this invention, such determinations of the nature of porous zones can be made very readily and with great accuracy.

In its preferred form, the present invention contemplates the introduction into an underground cavity, for example an oil well, of particulate material of at least two distinctively different size ranges, each size range being associated with a different radioactive tracer material and each emitting gamma rays of specific energy. The ultimate distribution of these radioactive particles is attained by maintaining the flow of the suspending fluid down the well bore and out into the formation. In the course of the distribution of the particles, and because of the significantly different sizes of particles which are employed, it is found that they become separated out from the suspending fluid at various points along the casing and along the face of the well bore proper. The openings in the casing and in the formation act as sieves; accordingly, the larger particles may be screened out at one point and the smaller particles are permitted to pass through the same point and are stopped and screened out at a more removed location. For example, the larger particles are found to be screened out by the small openings in the casing and the smaller particles are screened out by openings in the formation. It will be understood that several particle sizes may be employed and that the size of the particles themselves may vary widely. Having permitted the distributing action of the particles to take place through the casing and out into the formation, the points at which the different radioactive materials have been screened out and deposited are located by surveying the well with suitable radiation detecting instrumentation. Logs based upon the detection operations and the points of origin of the detected radiations are made, and from these logs the locations of the points of deposition of the various radioactive materials are easily determined. In determining the nature of the porosity of formations, similar procedure is employed. In this aspect of the invention, an estimation of the relative areas of the formation face which contains intergranular, vesicular, or fractured porosity is provided by observing the size particle which is screened from the well fluid by the formation into which the well fluid is passing. In making this determination, as will be seen at a later point herein, it is advantageous to maintain an accurate accounting of the total gamma ray activity of each trace element that is used.

It is also necessary to take into account the contribution of radiation from the formation as well as that from tracers which has been degraded through multiple scattering. For example, when it is known that there is a deposition of antimony-124 activated particles which primarily radiate energetic gamma rays, it will be necessary to take into account the effect of this radiation after it has become degraded in energy through multiple scattering to the level where it will interfere with the detection of the softer radiation from scandium-46, cesium-137 or iodine-131. It will therefore be necessary to determine the intensities of the more energetic radiations first in order to estimate their contribution to the background affecting the estimation of the intensity of the softer radiations.

The dispositoin of the tracer material on the face of the formation as the invention is practiced will present a variety of situations. In the first place, throughout the depth of the borehole, a number of formations will oftentimes be traversed that exhibit this sieving property thereby leading to deposition of tracer material on each of them in varying degree and kind. In other cases it may be that all of the materials will be deposited at one point in the well. In still other cases, it may be found that only a single of the tracer elements will be observed on one or more of the zones under consideration. While it is believed that it will be clear to those skilled in the art the true meaning of what is reflected by the logs that are made according to this invention, it may be helpful to set forth here examples of the conclusions to be drawn from some of the various tracer deposition patterns that may be encountered in practicing the invention. Accordingly, some examples are set forth hereinafter in which two radioactive tracer materials are utilized, namely iodine-131 and antimony-124. The choice of tracers is by no means limited to these two however. As many trace elements as desired can be used with specific particle sizes as long as the method and apparatus used to identify and measure the relative intensities is able to resolve the specific energy spectra of the trace elements, e.g. cerium-141, cesium-barium-137, cobalt-60, scandium-46, iron-59 and sodium-24, to name a few. The particular material can be either resinous or crystalline; for example, crystals of material insoluble in the fluid medium may be used which incorporate a radioactive isotope within its structure, or the particles made of ion exchange material which has adsorbed quantities of radioactive isotope. On the other hand, mixtures of radioactive materials and resinous material may be solidified, as, for example, in the incorporation of a tracer material in casting resins such as polystyrene, the acrylic acid derivatives, the phenolics or epoxy resins.

As a particular example of a preferred form of this invention, iodine-131 may be attached to the smaller size particles, in the range of about 2–10 microns, to the extent of 1.5 millicuries, and 0.5 millicurie of antimony-124 may be attached to a similar quantity by weight of 500–2000 microns or larger particles. In this example, a suitable well fluid, for example fresh water, brine or petroleum, is used to distribute these particles in like quantity to a series of wells wherein it is desired to examine fracture porosity. From the tracer log obtained from a first well, it is found that the entire quantity of iodine-131 and the entire quantity of antimony-124 are deposited in the same zone. In this case it is clear that there can be only one permeable zone in the formations undergoing study. Furthermore, inasmuch as only intergranular porosity is small enough to exclude the smaller tracer particles used, it must be concluded that the zone consists entirely of intergranular porosity since both of the tracer materials are found deposited at the same point, neither having been carried into the formation with the fluids.

In a second well, having run the tracer log therein, it is found that 0.3 millicurie of iodine is deposited in one zone together with 0.1 millicurie of antimony-124. In two other zones of the same well, 0.1 and 0.3 millicurie, respectively, of antimony-124 are found, but with no iodine-131 being present in either instance. In this case, it is clear that the zone containing the iodine-131 is predominantly of intergranular porosity inasmuch as a substantial quantity of the small-mesh tracer material is observed and in addition a small quantity of antimony-124 is present which is carried on the larger particle size. As to the other two zones, it is apparent that they contain no permeable intergranular porosity inasmuch as none of the iodine-131 is filtered out on the faces of the zones; moreover, it is equally apparent that these zones consist substantially entirely, if not entirely, of fracture-type or vugular type porosity inasmuch as they collected no iodine activated particles and collected 80% of the total antimony-124. It will be observed that a comparison of the net footages involved in the zones provides the reservoir engineer with an estimate of the percentage of fracture or vugular and intergranular-type porosity contributing to the field production in addition to information concerning the relative degree of acceptance of well fluid by the permeable strata.

In a third well, the tracer log having been prepared, it is found that no iodine-131 is located and that the 0.5 millicurie of antimony-124 is distributed over the entire pay zone. Clearly, in this instance all of the production comes from fracture-type or vugular type porosity since the formation has passed the entirety of iodine and withheld or screened out the entirety of antimony-124.

In a fourth well, having prepared the tracer log, it is found that 0.5 millicurie of iodine-131 is distributed over the entire face of the pay zone together with 0.5 millicurie of antimony-124. The conclusion to be drawn from this is that the entire pay zone consists of intergranular porosity permeated with fractures or vugs to a substantial extent inasmuch as only 0.5 millicurie of iodine has been filtered out, and this is found evenly distributed over the face of the zone, and all of the antimony-124 is accounted for. Accordingly, the reservoir engineer will use the appropriate recovery factor for the case exhibiting an essentially homogeneous formation penetrated by fractures or vugs.

It is usually advantageous to label the smallest particle size range with the trace element emitting the most energetic gamma radiation and proceeding with the labeling in the reverse order to that use in the example just given, until the largest size range used is tagged with the tracer emitting the softest gamma radiation. By this means the energetic gamma rays are eliminated from consideration in those cases where they disappear into the pore structure and it is therefore unnecessary to take into account the contribution of their degraded radiation to the background during the measurement of the softer gamma ray intensities. The accuracy of measurement is also generally improved because if the finer particles are known to be present, as denoted by their energetic gamma ray emissions, it becomes unnecessary to determine the lower energy intensities with great acuracy because it is obvious that they must also be present.

An object of the invention is to make a plurality of radioactivity tracer logs with but a single injection of tracer.

A further object of the invention is to make a log of the permeability of the formations by use of a composite radioactivity tracer.

From the foregoing, it is believed that the principle underlying the invention will be amply clear and further that it is subject to many variations. The underlying process obviously may be extended to cover as many particle size ranges, and corresponding spectral energy levels as may be found desirable or convenient. Similarly, the quantity of radioactive materials is not critical so long as the quantity is provided in an amount suited to the detection facilities employed.

Further it should be appreciated that the word "size" does not imply merely volume or even area. It includes different linear dimensions and therefore shape. For example, filamentary material will not pass a hole through which a ball of the same volume or even the same cross-sectional area will freely pass. In general it is the cross-section that is important, and flaked or filamentary shapes are preferred in many applications. It should also be kept in mind that "size" includes a range of sizes. The important criterion is that there be a size difference between substantially all particles of each tracer material and substantially all particles of each other tracer material. Still further it is within the contemplation of this invention that a single tracer material include more than one radioactive element.

Figure 2:
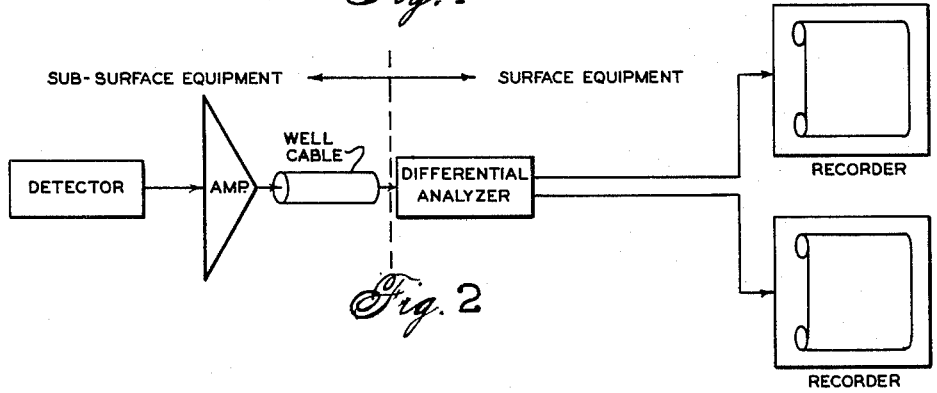

As those skilled in the art will appreciate, various forms of well logging equipment may be employed for detecting the tracer materials and recording the intelligence derivable therefrom. Accordingly, such equipment is not critical in practicing the invention so long as there is indication of the tracers from which may be derived accurate information as to intensity and quantity of the tracer materials present at the various levels within the well bore. However, in order still more fully to describe the invention, drawings are appended hereto illustrating, in block-diagrammatic form, equipment assemblies suitable for use in carrying the invention into effect, in which:

FIGURE 1 is a block diagram of apparatus used in accordance with this invention in which the gamma rays of different energies are distinguished by detectors of different sensitivity; and FIGURE 2 is a block diagram of such apparatus in which but a single radiation detector is used and the gamma rays distinguished by a subsequent spectrum analyzer.

Referring to the drawings, FIGURE 1 shows a simple arrangement of apparatus in which Geiger-Mueller tubes are employed for detecting the gamma radiation emitted by the tracers. As will be observed, two separate detecting and recording assemblies are utilized, which each include a detector, an amplifier, a pulse integrator and a recorder, the two latter components being located above ground and the former components being contained within the usual instrument housing suspended from a cable within the well bore. The two assemblies are designated generally A and B respectively. The detector of assembly A is provided with shielding sufficient to absorb substantially all the relatively soft radiation of tracers such as cerium-141, cerium-144 or iodine-131. Accordingly, in conducting the tracer study the well bore assembly A will respond only to high energy tracers, such as antimony-124 indicated above. The shielding material for observing the soft radiations is designated in the assembly by numeral 10. The shielding may be any suitable material, for example, lead. On the other hand, the detector employed in assembly B is not shielded and is adapted to detect the full range of energy emitted by all of the tracer materials.

As will be observed, each detector of FIGURE 1 is connected to its own integrating and recording circuit and consequently the recorded intensities are proportional in the case of assembly A to the quantity of the energetic tracer materials, and in the case of assembly B to the sum of both tracer materials. As will be seen, the specific quantity for each tracer material may then be determined by subtraction of the data which are afforded by the recorders.

Instead of employing shielded Geiger-Mueller tubes, scintillation or proportional counters may be employed, that is, counters providing electrical output pulses of energies or pulse heights directly related to the energies of the radiations being detected, and electronic pulse height discriminator circuits may be included in the system, whereby the low energy tracers may be eliminated electronically instead of as is accomplished by assembly A of FIGURE 1 wherein one detector is shielded.

If desired, a single detector such as a scintillation or proportional counter may be utilized, the signal from which is delivered to a plurality of differential discriminators, each being adjusted to pass only those pulses due to a particular tracer material. Obviously, as many discriminators may be employed as desired each adjusted to accomplish the elimination or passage of particular detector signals to suit any mode of operation that may be adopted. By this arrangement the gamma ray energy spectrum as presented by the pulse amplitudes originating in the detector may be selectively analyzed for those pulses which represent a definite gamma ray energy and only those pulses recorded. In this arrangement each discriminator is adjusted so that the pulse heights falling between each of a pair of discriminator levels represent the gamma ray energies it is desired to record.

As illustrated in FIGURE 2, another assembly which may be utilized employs a detector and an amplifier contained in apparatus adapted for underground use and a multi-channel analyzer on the surface connected to a series of integrators each of which is in turn connected to its respective recorder. This is equivalent to the plurality of differential discriminators mentioned above. As will be appreciated by those skilled in the art, this arrangement permits the use of as many tracers as may be analyzed by the available channels of the analyzer and the information provided may be transmitted over a single conductor well cable to the analyzer and recording equipment located at the surface. In using this assembly, a record is made of the entire energy range including all tracers. From these logs, the intensity, quantity and identity of the tracer deposits at all points along the well bore are readily derived.

As will be appreciated, various other arrangements of equipment are possible and it is desired to make clear that the invention is not restricted to any particular electrical assembly.

The choice of tracer material is not entirely confined to the utilization of radioactive particles of gross size suspended in a non-radioactive fluid medium. It is obvious that the fluid medium can also be made to be radioactive by dispersing therein extremely fine particles (e.g., colloids), molecular dispersions (e.g., un-ionized substances) and ionizing substances (e.g., electrolytes). The fluid medium can be tagged by the inclusion of radioactive isotopes within the structure of these colloids, compounds or ions. Examples of these are, respectively: colloidal dispersions of arsenous sulfide containing either arsenic-76 or sulfur-35; tritium oxide ($T_2O$) or hydrogen-tritium oxide (HTO) dispersed in water; sodium iodide containing either sodium-24 or iodine-131.

The use of such an activated fluid medium (having particles of very small size) in combination with activated particles of gross size extends the utility of the invention. For example a suitable combination would be a radioactive fluid medium consisting of water made radioactive by dissolving therein some potassium iodide containing iodine-131 and dispersed within this radioactive fluid are particles of gross size which are activated by adsorption of iodine-131 or some other radioactive isotope. When this mixture is introduced into the flowstream of a water injection well in an oil field water-flooding project and pressure is applied to the fluid column in the well, the mixture of radioactive fluid and radioactive particles move down the borehole until a permeable stratum is reached. Here the radioactive fluid enters and disappears within the formation while the gross sized particles are prevented from doing so by the sieving action of the pore openings into the permeable rock.

A gamma ray log made of the well subsequent to this deposition denotes the presence of the radioactive particles retained on the well face and thereby locates the zone of egress of the fluid from the well. Gamma ray logs made in neighboring wells will show the presence of I-131 radiation upon the appearance of the radioactive fluid in those wells after traveling through the formation from the injection well. By means of gamma ray logs run in these neighboring wells, one may locate the zones producing the radioactive fluid and this information together with the location of the zone of egress, locates a bypassing channel. Steps may then be taken to reduce the effect of such channeling on the efficiency of the waterflood. It is important in making such a log that the radiation intensity of the well fluid be determined exclusively in so far as is possible without the effects of the radiation from the formation itself.

The location of the points of entry of such a radioactive fluid can be determined more precisely and with no influence from the radioactivity of the formation, by taking well fluid samples at specific depth intervals and determining the relative quantities of radioactive fluid within the samples by subsequent analysis at the surface.

In the event that the transit time between wells is too great to permit the use of short lived radioactive trace elements such as iodine-131 or should the chemical properties of the formation result in excessive adsorption of such a trace element, the fluid can be rendered radioactive by means of $T_2O$ or HTO. In that case it will be necessary to use the sampling technique described to locate the point of entry of the radioactive fluid into the neighboring wells due to the weak beta radiation from tritium.

Another application for the use of a radioactive fluid medium in combination with radioactive particles of gross sizes is the identification and location of permeable formations by the adsorption of the radioactive constituents from the fluid by the internal pore surfaces of the formation.

For example, it is possible to identify formations containing clay minerals such as argillaceous cemented sandstones or shales and to distinguish them from limestones and calcareous cemented sandstones by the adsorption of an anionic or cationic substance of known affinity for the clay minerals, the anionic or cationic substance containing a radioactive isotope identifiable by its gamma ray energy spectrum.

For example, the suspension of particles of a gross size range activated with scandium-46, which emits a 1.12 mev. gamma ray together with particles of a second and larger gross size range activated with antimony-124, which emits a 2.04 mev. gamma ray, within a fluid medium containing ions of cesium-137 which emits a 0.662 gamma ray through a daughter product, provides a means for obtaining information as to the kind of porosity present and also information as to the chemical nature of the formation, i.e., whether or not the formation contains clay minerals with an affinity for a cationic substance.

After introduction into the well of the fluid medium and its radioactive particles and the subsequent application of pressure to the fluid column, the fluid and particles travel down the borehole until the permeable formation is reached. The radioactive fluid enters the permeable zones and in all such zones where clay minerals are present, the radioactive cesium ion is adsorbed while in the other permeable zones which contain no clay minerals there is no cesium adsorption. The particle sizes are distributed over the face of the permeable formation in the manner described earlier and the nature of porosity can be determined by observing whether the particulate material is filtered out on the face of the formation or enters it and disappears.

The various radioactive materials may be selectively measured by their place of occurrence. In the above example, the gross particles may be made so large that they are retained in the input well so that all added radioactivity in the input well is indicative of the gross particles while all added radioactivity in the producing well is indicative of the radioactive solution—each may be selectively measured to the exclusion of the other.

In a further modification, the various radioactive materials may be selectively measured by their difference in half life. That is, the occurrence of short-lived materials and long-lived materials may be measured at one time, and at a time after the short-lived materials have substantially disappeared, the occurrence of the long-lived may be measured. Comparison of measurements provides a complete analysis of the location of the various materials.

Various other modifications are within the scope of this invention, which is limited only by the following claims. In general, the invention is the method of making a plurality of radioactivity tracer measurements with a single tracer injection.

What I claim is:

1. The method of radioactivity tracer logging within a borehole which comprises delivering into said borehole a fluid containing a plurality of different tracers, each of said tracers being composed of particles of radioactive materials falling within a pre-selected particle size range exclusive of the size ranges of the other of said tracers, said particles of one size range emitting radiations of an energy different from the energies of radiations emitted by said other tracers, whereby at least a portion of said fluid passes into formations surrounding said borehole thereby depositing said tracer materials along said borehole in accordance with paterns determined by permeability characteristics of said formations and borehole conditions; and thereafter determining the distribution of each of said tracer materials with respect to said formations by selectively measuring the radiations coming from each, thereby providing information indicative of fluid receptivity characteristics of said borehole along its length.

2. The method of radioactivity tracer logging within a borehole which comprises delivering into said borehole a fluid containing a plurality of different tracers, each of said tracers being composed of particles of radioactive materials falling within a pre-selected particle size range exclusive of the size ranges of the other of said tracers, said particles of one size range emitting radiations of an energy different from the energies of radiations emitted by said other tracers, whereby at least a portion of said fluid passes into formations surrounding said borehole thereby depositing said tracer materials along said borehole in accordance with patterns determined by permeability characteristics of said formations and borehole conditions, said sizes being in the inverse order of said energizes; and thereafter determining the distribution of each of said tracer materials with respect to said formations by selectively measuring the radiations of energy characteristic of each, thereby providing information indicative of fluid receptivity characteristics of said borehole along its length.

3. The method of radioactivity tracer logging within a borehole which comprises delivering into said borehole a fluid containing a plurality of different tracers, each of said tracers being composed of particles of radioactive materials falling within a pre-selected particle size range exclusive of the size ranges of the other of said tracers, said particles of one size range emitting radiations of an energy different from the energies of radiations emitted by said other tracers, forcing at least a portion of said fluid into formations surrounding said borehole thereby depositing said tracer materials on said formations in accordance with patterns determined by permeability characteristics of said formations; and thereafter determining the distribution of each of said tracer materials with respect to said formations by selectively measuring the radiations coming from each, thereby providing information indicative of fluid receptivity characteristics of said formations.

4. The method of radioactivity tracer logging within a borehole which comprises delivering into said borehole a fluid containing a predetermined quantity of each of a plurality of different radioactive tracer materials, each of said tracer materials being composed of radioactive particles falling within a preselected particle size range exclusive of the particle size range of the other tracer materials, said particles of one size range emitting radiations of an energy different from the energies of radiations emitted of other ranges; forcing at least a portion of said fluid into formations surrounding said borehole thereby depositing said tracer materials on said formations in accordance with patterns determined by permeability characteristics of said formations; and thereafter quantitatively determining the distribution of each of said tracer materials with respect to said formations by selectively measuring the radiations coming from each, thereby providing information indicative of fluid receptivity characteristics of said formations.

5. The method of radioactivity tracer logging within a borehole which comprises delivering into said borehole a fluid containing a plurality of different particulate radioactive tracer materials, each of said tracers being composed of particles of radioactive material falling within a pre-selected particle size range exclusive of the particle size range of the other tracer materials, said particles of one size range emitting radiations of an energy different from the energizes of radiations emitted by particles of other ranges, whereby at least a portion of said fluid passes into formations surrounding said borehole thereby depositing said particulate tracer materials on said formations in accordance with patterns determined by permeability characteristics of said formations; and thereafter determining the distribution of each of said particulate tracer materials with respect to said formations by selectively measuring the characteristic gamma rays coming from each, thereby providing information indicative of fluid receptivity characteristics of said formations.

6. A method of radioactivity tracer logging within a cased borehole, said method having in view the object of determining the presence of and location of openings in said casing permitting the escape of fluid therefrom into the formation and the further view of locating thief zones in said formations, which comprises introducing into said casing a fluid containing a plurality of different radioactive tracer materials, each of said materials being composed of radioactive particles falling within a pre-selected particle size range exclusive of the particle size range of the other materials, said particles of one size range emitting radiations of an energy different from the energies of radiations emitted by particles of other ranges; forcing at least a part of said fluid to pass from said casing into the volume surrounding said casing and into any thief zones present in said formations; thereafter determining the location and identity of deposits of said tracer materials, whereby to learn the points at which said fluid leaves the casing and the points at which said fluid leaves the volume surrounding said casing.

References Cited in the file of this patent
UNITED STATES PATENTS

| | | |
|---|---|---|
| 2,308,176 | Howell | Jan. 12, 1943 |
| 2,318,689 | Hodell et al. | May 11, 1943 |
| 2,446,588 | Herzog et al. | Aug. 10, 1948 |
| 2,451,520 | Teplitz | Oct. 19, 1948 |
| 2,544,412 | Bird | Mar. 6, 1951 |
| 2,560,510 | Hinson | July 10, 1951 |
| 2,588,210 | Crisman et al. | Mar. 4, 1952 |
| 2,751,506 | Black et al. | June 19, 1956 |
| 2,769,913 | Mazzagatti | Nov. 6, 1956 |
| 2,810,076 | Mardock | Oct. 15, 1957 |
| 2,811,650 | Wagner | Oct. 29, 1957 |
| 2,938,860 | Guinn et al. | May 31, 1960 |